(12) United States Patent
Samant et al.

(10) Patent No.: US 6,519,018 B1
(45) Date of Patent: *Feb. 11, 2003

(54) VERTICALLY ALIGNED LIQUID CRYSTAL DISPLAYS AND METHODS FOR THEIR PRODUCTION

(75) Inventors: Mahesh Govind Samant, San Jose, CA (US); Joachim Stöhr, Woodside, CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/185,324

(22) Filed: Nov. 3, 1998

(51) Int. Cl.$^7$ ............................................. G02F 1/1337
(52) U.S. Cl. ........................................ 349/130; 349/123
(58) Field of Search ................................ 349/130, 123, 349/110, 156, 178

(56) References Cited

U.S. PATENT DOCUMENTS

| | | | |
|---|---|---|---|
| 3,972,589 A | 8/1976 | Skelly et al. | 549/130 |
| 3,989,354 A | 11/1976 | Dubois et al. | 349/130 |
| 4,022,934 A | 5/1977 | Miller | 349/130 |
| 4,112,157 A | 9/1978 | Krueger et al. | 349/130 |
| 4,256,377 A | 3/1981 | Krueger et al. | 349/130 |
| 4,411,494 A | 10/1983 | Crossland et al. | 349/138 |
| 4,472,028 A | 9/1984 | Ooue et al. | 349/131 |
| 4,492,432 A | 1/1985 | Kaufmann et al. | 349/131 |
| 4,536,059 A * | 8/1985 | Van Den Berk | 350/333 |
| 4,564,266 A | 1/1986 | Durand et al. | 349/177 |
| 4,568,833 A | 2/1986 | Roelofs | 250/398 |
| 4,683,378 A | 7/1987 | Shimase et al. | 250/492.2 |
| 4,701,028 A | 10/1987 | Clerc et al. | 349/98 |
| 4,785,188 A | 11/1988 | Mori et al. | 250/398 |

(List continued on next page.)

FOREIGN PATENT DOCUMENTS

JP 62-299816 * 12/1987

OTHER PUBLICATIONS

Koike et al. (1992), "A Full–Color TFT–LCD with a Domain–Divided Twisted–Nematic Structure," *SID 92 Digest,23:*798–801.

Lee et al. (1997), "Microscopic Molecular Re–Orientation of Polymer Surfaces Induced by Rubbing and Factors Determining LC Pretilt Angles," *Polymer Surfaces and Interfaces: Characterization, Modification and Application,*pp. 295–315.

Lien et al. (1995) "UV Modification of Surface Pretilt of Alignment Layers for Multidomain Liquid Crystal Displays," *Appl. Phys. Lett., 67*(21):3108–3110.

Okamoto (1998), "MVA Liquid Crystal Technology— Latest Version of VA Liquid Crystals," *Nikkei Flat Panel Display,*pp. 104–107.

Primary Examiner—William L. Sikes
Assistant Examiner—Dung Nguyen
(74) Attorney, Agent, or Firm—Reed & Associates

(57) ABSTRACT

Homeotropic liquid crystal displays, and methods for their production and use, are provided. The alignment layers of the subject displays have at least one alignment structure rising from a planar substrate. At least a portion of the wall has a bond anisotropy sufficient to align liquid crystal molecules substantially vertical to the planar substrate of the alignment layer. The subject displays find use in a variety of different applications, including in monitors for use in laptop computers, desktop computers, televisions, and the like.

24 Claims, 6 Drawing Sheets

U.S. PATENT DOCUMENTS

| | | | |
|---|---|---|---|
| 4,939,360 A | 7/1990 | Sakai | 250/251 |
| 5,039,185 A | 8/1991 | Uchida et al. | 349/178 |
| 5,065,034 A | 11/1991 | Kawanami et al. | 250/505.1 |
| 5,151,605 A | 9/1992 | Politiek et al. | 250/398 |
| 5,268,781 A | 12/1993 | Shigeta et al. | 249/230 |
| 5,303,076 A | 4/1994 | Okada et al. | 349/130 |
| 5,313,419 A | 5/1994 | Chang | 365/182 |
| 5,313,562 A | 5/1994 | Wiltshire | 349/130 |
| 5,359,439 A | 10/1994 | Miller et al. | 349/124 |
| 5,636,004 A | 6/1997 | Ootaka et al. | 355/67 |
| 5,661,366 A | 8/1997 | Hirota et al. | 315/5.41 |
| 5,744,305 A | 4/1998 | Fodor et al. | 435/6 |
| 5,745,205 A | 4/1998 | Kato et al. | 349/130 |
| 5,747,221 A | 5/1998 | Kim et al. | 430/311 |
| 5,757,454 A | 5/1998 | Ogishima et al. | 349/130 |
| 5,776,836 A | 7/1998 | Sandhu | 438/717 |
| 5,777,342 A | 7/1998 | Baer | 250/492.2 |
| 5,880,801 A * | 3/1999 | Scherer et al. | 349/130 |
| 6,020,946 A * | 2/2000 | Callegari et al. | 349/124 |
| 6,061,114 A * | 5/2000 | Callegari et al. | 349/125 |
| 6,061,115 A * | 5/2000 | Samant et al. | 349/129 |
| 6,346,975 B2 * | 2/2002 | Chaudhari et al. | 349/124 |

* cited by examiner

A

B

VERTICALLY ALIGNED LIQUID CRYSTAL DISPLAYS AND METHODS FOR THEIR PRODUCTION

TECHNICAL FIELD

The field of this invention is liquid crystal displays.

BACKGROUND OF THE INVENTION

Liquid crystal displays find use in a variety of different applications, such as data displays in watches, calculators and the like, as well as in flat panel displays found in laptop or notebook computers. Liquid crystal displays offer many advantages over alternative technologies, e.g. cathode ray tube based displays, where such advantages include: low power consumption, small size, light weight, and the like. As such, it is believed by many that liquid crystal displays will find wide-spread use in an even larger number of different applications than those in which they currently find use, where it is envisioned that liquid crystal displays will eventually become standard features in desktop computer monitors, televisions, etc.

In typical flat panel displays currently found in many laptop computers, the picture on the screen of the display is composed of many pixels. In each pixel the desired color is created by "mixing" blue, green and red primary colors of different intensities by means of a patterned color filter. The intensity of each color is adjusted by using liquid crystals to change the transmitted light intensity. The liquid crystal (LC) is composed of rod-like molecules which prefer to point in the long direction of the rods. In the most common, so called "twisted nematic" displays, a nematic LC is filled into the gap, a few microns wide, between two polyimide films coated onto indium-tin-oxide (ITO) electrodes which, in turn, are deposited onto two glass-plate polarizers. In order for the display to work, the LC molecules have to be anchored down nearly parallel to the surfaces of the polyimide films such that on opposite sides they point into the perpendicular directions of the two crossed polarizers. The LC molecules thus form a twisted helix from one side to the other in the display. When light traverses such a structure it is polarized by the first polarizer along the long axis of the LC molecules anchored to it. As the light progresses through the LC the polarization of the light changes from linear to elliptical so that part of the light is transmitted by the second, perpendicular polarizer. Since the light transmission depends on the orientation of the LC rods it can be changed by rotation perpendicular to the long axis of the rods. This is accomplished by application of a small voltage, pixel by pixel, by means of microscopic (ITO) electrodes independently driven by a transistor array. As the voltage is increased the LC long axis becomes increasingly parallel to the electric field direction, which is parallel to the light direction. The light polarization becomes less affected by the LC and the light transmission is reduced because of the crossed polarizers.

Conventional twisted nematic displays have two important shortcomings with respect to manufacturing and performance. First, the rubbing processes used in manufacturing are problematic for a number of reasons, including the numerous processing steps required, the potential for contamination and low production yield, and the requirement of wet processing steps. As such, alternative technologies for producing alignment layers have been developed. One such technology that has promise as a substitute for conventional rubbing protocols is ion beam bombardment. Secondly, the displays suffer from a narrow viewing angle. One means of improving the viewing angle of displays is to use methods such that the liquid crystal molecules are aligned perpendicular or nearly perpendicular to the substrate surfaces in the absence of an electric field (black state). Under application of a voltage between the two substrate surfaces the molecules of a negative LC (preferred alignment perpendicular to the electric field) will become more parallel to the substrate surfaces. If the LC rods, upon rotation in the electric field, are at least partially aligned at a 45 degree angle with respect to the two crossed polarizers the cell will transmit light (white state). Such displays are known in the art as homeotropically or vertically aligned (VA) displays. A display is said to be "single domain" if the LC molecules have a single pre-tilt angle along one azimuthal direction of the surface plane (i.e. the long axis of the LC molecules is orientated along in-plane direction and tilted up from that direction by a well defined angle which, in the case of current 12.1 inch SVGA displays, is a few degrees) and hence long axes of all LC molecules appear more or less parallel to each other over the whole display. A multi-domain display contains at least two differently oriented single domain regions such that the two or more single domain regions form a color sub-pixel of the display. In particular, multi-domain vertically aligned (MVA) displays offer ultra wide viewing angles (Kenji Okamato, Nikkei Flat Panel Display, pp. 104–107 (1998)).

Because of the advantages of producing alignment layers through ion beam bombardment protocols and the known advantages of VA liquid crystal displays, there is interest in the field in developing ion beam bombardment methods for producing such displays, in particular of the MVA type.

Relevant Literature

U.S. Patents describing homeotropic liquid crystal displays include U.S. Pat. Nos. 5,757,454; 5,745,205; 5,359,439; 5,315,419; 5,313,562; 5,303,076; 5,268,781; 5,039,185; 4,701,028; 4,564,266; 4,492,432; 4,472,028; 4,411,494; 4,256,377; 4,112,157; 4,022,934; 3,989,354; 3,972,589; the disclosures of which are herein incorporated by reference.

SUMMARY OF THE INVENTION

Vertically aligned (VA) and multi-domain vertically aligned (MVA) liquid crystal displays, and methods for their production and use, are provided. The subject displays comprise alignment structures on a planar substrate which locally align the LC vertical to the planar substrate. The alignment structure is generally made up of at least one wall or pillar, and usually a plurality of walls or pillars, rising from the surface of a planar substrate layer. At least one surface of the wall(s) or pillar(s) has bond anisotropy sufficient such that liquid crystal molecules adjacent to the surface are aligned along the vertical surface of the wall or pillar, i.e. vertically to the planar substrate. As a consequence, homogeneous (parallel) LC alignment relative to the wall surface results providing for a homeotropic (perpendicular) LC alignment relative to the planar substrate and polarizing material. By use of a suitable array of alignment structures, MVA displays may be manufactured. The subject VA and MVA liquid crystal displays find use in a variety of applications, including flat panel displays for computers, both laptop and desktop, in television monitors, and the like.

DESCRIPTION OF THE SPECIFIC EMBODIMENTS

Figure 1:
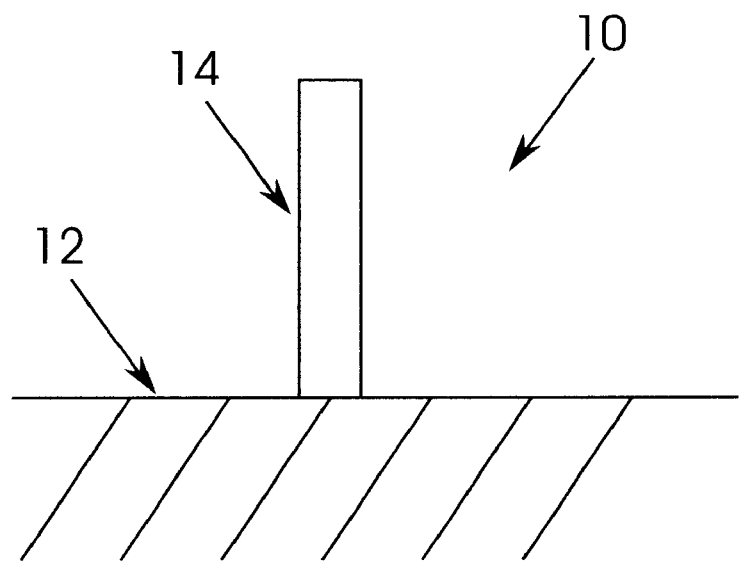
FIG. 1 provides a cross-sectional view of the VA scheme according to the subject invention. Here the vertical alignment of the LC is the result of the preferred homogeneous (parallel) alignment of the LC relative to the vertical surface of a wall or pillar alignment structure.

VA and MVA liquid crystal displays, as well as methods for their production and use, are provided. The subject displays are characterized by having a planar substrate surface and at least alignment structure, e.g. in the form of a wall or pillar, and usually a plurality alignment structures, rising therefrom. In general, the substrate material may be different from the material of the wall or pillar. At least a portion of the surface of the wall(s) or pillar(s) has bond anisotropy sufficient to vertically align liquid crystal molecules positioned on the alignment layer. The subject displays find use in a variety of different applications, including in computer and television monitors.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an" and "the" include plural reference unless the context clearly dictates otherwise. Unless defined otherwise, all technical and scientific terms used herein have the same meaning as commonly understood to one of ordinary skill in the art to which this invention belongs.

A critical feature of the subject VA and MVA displays is the existence of vertical alignment structures, e.g. vertical or nearly vertical walls or pillars, which homogeneously align liquid crystal molecules parallel to the surface of the alignment structure, e.g. the wall or pillar surface, and substantially vertical to the planar substrate and the polarizing material of the display, e.g. polarized glass on the surface of which the substrate layer is present. Therefore, in the absence of any voltage the liquid crystals are substantially perpendicular to the surface of the planar substrate. By substantially perpendicular is meant that the liquid crystal molecules are not aligned at exactly 90° to the surface of the substrate, but instead are vertically aligned with a slight deviation from 90°, i.e. possess a pretilt, where the pretilt angle (with respect to the alignment layer surface normal) of the liquid crystal molecules aligned by the subject alignment is at least about 0.1°, usually at least about 1° and more usually at least about 3°, and may be as great as 6° or greater, but will usually not exceed about 30° and more usually will not exceed about 15°.

The alignment structures may have a variety of different configurations, where either pillars or walls are of particular interest. Where the alignment structures are pillars, the pillars or columns may have a variety of different cross-sectional shapes, including triangular, square, circular, oval, rectangular, trapezoidal, pentagonal, hexagonal, and the like, including irregular linear and curvilinear cross-sectional shapes.

Figure 2:
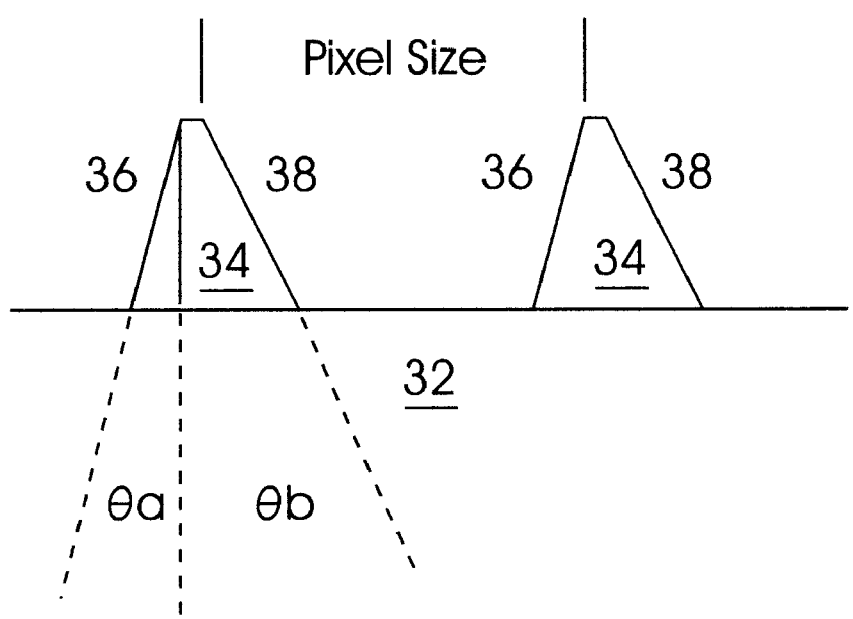
FIG. 2 provides a cross-sectional view of the VA scheme according to the subject invention. Here the vertical alignment of the LC is the result of the preferred homogeneous (parallel) alignment of the LC relative to the surface of a wall or pillar alignment structure whose walls are tilted from the vertical by one or more angles θ.

The alignment layers of the subject invention are characterized by the presence of at least one alignment structure, e.g. wall or pillar, rising from the surface of a substrate layer, as illustrated in FIG. 1. In FIG. 1, alignment layer 10 comprises planar floor or substrate layer 12 and wall or pillar 14 arising therefrom. The wall or pillar may arise from the floor surface substantially perpendicular to the floor surface, as shown in FIG. 1, or at an incline, as shown in FIG. 2. In FIG. 2, alignment layer 30 has floor 32 and walls 34 arising therefrom. Wall surfaces 36 and 38 arise at an incline from floor surface 32, where the angle of incline of wall surface 36 is different from that of wall surface 38. The angle of incline of surface 36 is noted in the FIG. 2 as θa while that of surface 38 is noted as θb. θa and θb may range from about 0° to 30°, usually from about 1° to 10°.

Figure 3:
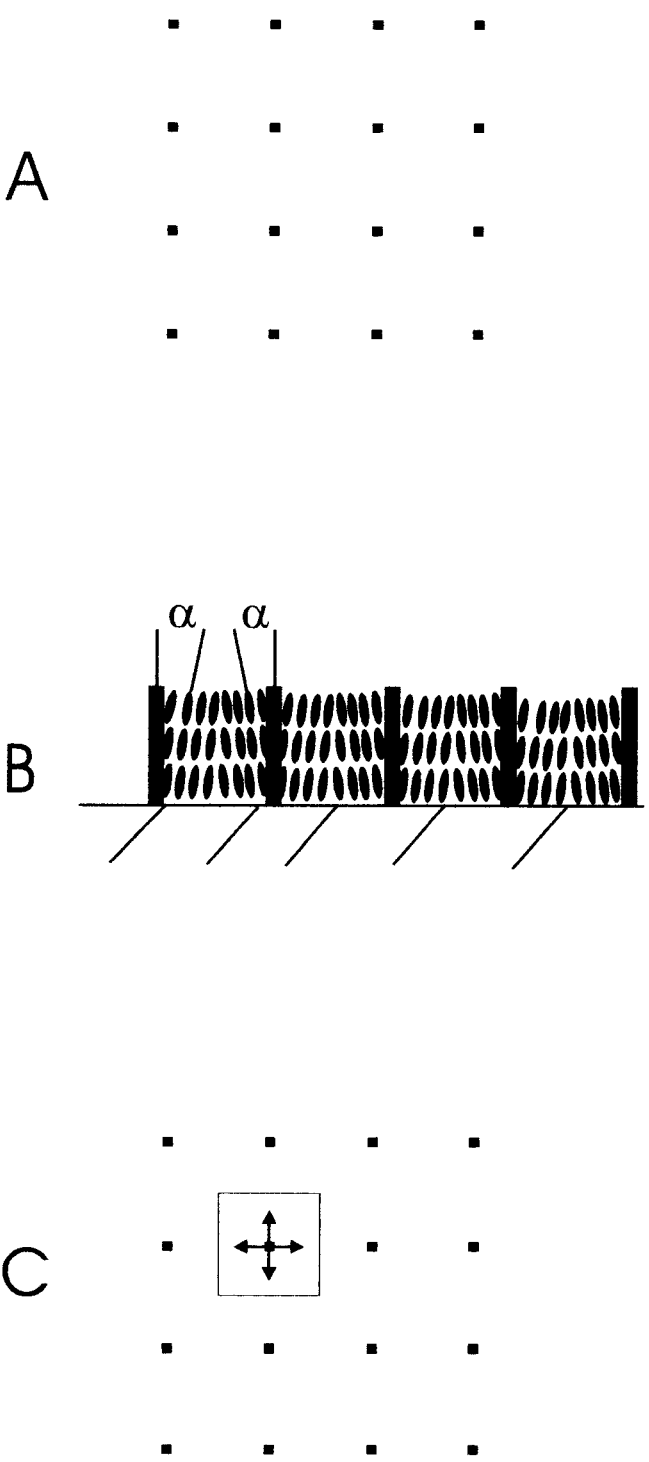
FIG. 3A provides a top view of a possible MVA alignment scheme according to the subject invention. Here an array of pillars is used so that around each pillar the LC molecules are nearly vertically aligned with a small tilt angle α from the vertical as shown in side view in B. For a square pillar the LC tilt angle will be in four orthogonal directions as indicated in C. The resulting four tilt domains around the pillar form a color subpixel of the display which is indicated by the box in C.
Figure 4:
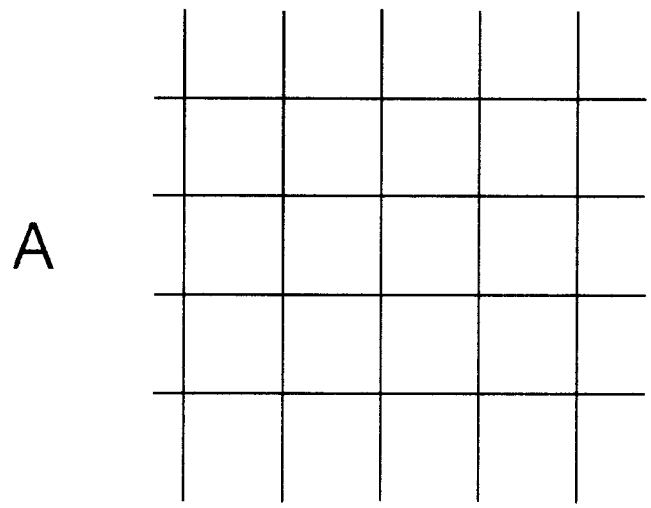
FIG. 4A provides a top view of a possible MVA alignment scheme according to the subject invention. Here a square array of walls is used so that inside each square the LC molecules are nearly vertically aligned with a small tilt angle α from the vertical as indicated in side view in B. The LC tilt angles will be in four orthogonal directions as indicated in C. The resulting four tilt domains which form a color subpixel of the display are indicated in the filled in box in C.
Figure 4:
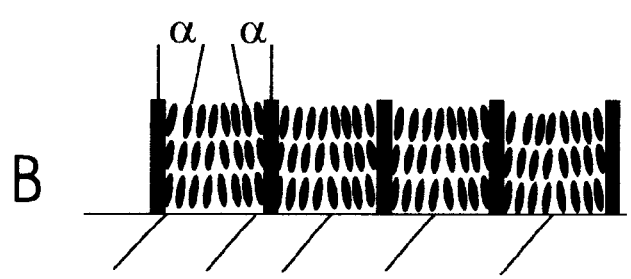
Figure 4:
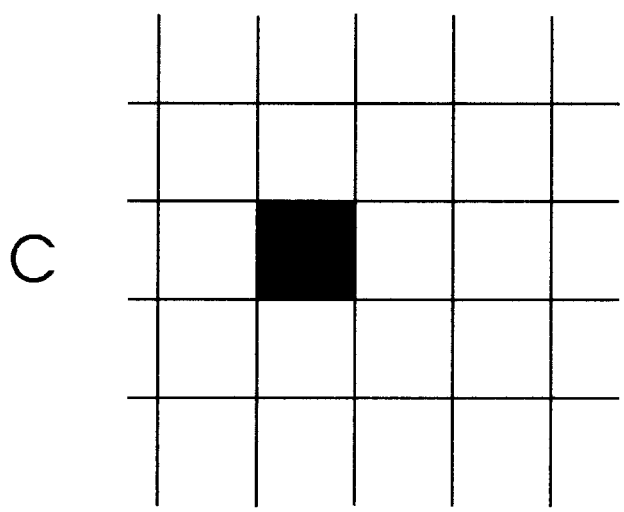

The wall(s) may be arranged in a number of different configurations across the surface of the substrate layer, where any particular configuration will be chosen based on the intended use of the alignment layer and the liquid crystal display device that incorporates it. Thus, the alignment layer may comprise a plurality of pillars arranged across its surface in rows, as shown in FIG. 3A. Alternatively, the walls of the alignment structures may form a plurality of cells on the surface of the alignment layer, where the cells may have a variety of different shapes, including square, rectangular, triangular, circular, ellipsoid, and the like. An example of a square arrangement of walls is shown in FIG. 4A.

Where the alignment layer is characterized by the presence of a plurality of walls or pillars arising from its surface, of particular interest are those alignment layers which give rise to regions of multiple tilt domains suitable for MVA applications. Of particular interest are structures which give rise to regions in which there are four or more tilt directions of the LC from the vertical, as illustrated in FIGS. 3B and 4B. If such regions are used as color subpixels as indicated as the filled in cells in FIGS. 3C and 4C, and the tilt directions are arranged to have non-vanishing projection onto the orthogonal polarization directions of the crossed polarizers the resulting MVA display will offer ultra-wide viewing angles. In FIG. 3, for example, the distance between any two pillars in the alignment structure approximates the dimensions of a color subpixel as indicated in FIG. 3C. In such embodiments, the distance will typically range from about 50 $\mu$m to 500 $\mu$m. In FIG. 4 the color subpixel coincides with the size of the flat square between the walls.

The wall(s) or pillar rising from the floor surface of the alignment layer will be of sufficient height to act as a spacer between planar components of the liquid crystal display device into which the subject alignment layers are incorporated. As such, the wall or pillar height will usually range from about 2 to 10 $\mu$m.

The walls or pillars of the alignment structures may be fabricated from a variety of different materials, so long as bond anisotropy can be induced in the material by ion bombardment. Materials finding use are typically optically transparent and amrphous or fine-grained, where by "amorphous" is meant that the atomic structure of the material has no preferred direction or orientation prior to ion beam bombardment. Suitable materials are also typically characterized by exhibiting ionic or partially ionic, covalent or partially covalent bonding. Materials finding use include: various polymers such as polyimide, hydrogenated diamond-like carbon (DLC), amorphous hydrogenated silicon, SiC, $SiO_2$, glass, $Si_3N_4$, $CeO_2$, $SnO_2$, $ZnTiO_2$, and the like. In many preferred embodiments, the alignment film comprises a polymer or hydrogenated DLC. The preparation of such alignment films on the surface of substrates are described in U.S. patent applications Ser. No. 08/644,788 filed May 10, 1996 and Ser. No. 09/028,018 filed Feb. 23, 1998 (IBM ref: YO996-070 and YO997-383 respectively), the disclosures of which are herein incorporated by reference.

The walls are further characterized in that at least a portion of the surface of the walls has bond anisotropy that is sufficient to align liquid crystal molecules vertical to the floor of the cell in which the wall is found, i.e. vertically to the substrate layer. By bond anisotropy is meant that the bonds on the surface of the wall are aligned in one direction such that liquid crystal molecules adjacent to the surface align in the direction of the bonds.

The floor surface of the alignment layer may or may not be fabricated from the same material as the walls. If the floor of the alignment layer is fabricated from the same materials as the walls, care must be taken during ion beam irradiation such that the floor is not exposed to ions during the irradiation process, as described in greater detail below. See FIG. 8. However, if the floor will be bombarded with ions during the irradiation process, the floor material will generally be fabricated from an ion beam inert material. A variety of different ion beam inert materials are known to those of skill in the art and suitable for use here, where such materials include metals, metallic alloys and the like.

In liquid crystal display devices comprising the subject alignment layers described above, the alignment layer will generally be present on the surface of a planar component of a polarized material. A variety of polarized materials are known and suitable for use as the planar component, including glasses, plastics, etc. The planar component may or may not be optically transparent, depending on the nature of the device into which it is to be incorporated, e.g. the component may have a reflective backing. The overall dimensions of the planar component will vary widely depending on the intended use of the display device fabricated therefrom.

Positioned between the substrate and the alignment film may be a metal oxide layer which serves to set up voltage across the cell of a liquid crystal display produced therefrom. The metal oxide film or layer may be arranged in rows and columns (as found in passive matrix displays) or patterned as the individual pixels of an active matrix display. Metal oxides from which this film may be fabricated include: indium tin oxide, and the like, where the preparation of such layers is known to those of skill in the art.

In liquid crystal displays of the subject invention, two planar components as described above are positioned in opposing relationship to each other, where a space is present between the two planar components due to the walls arising from the surface of the alignment layers. Only one of the planar components may contain vertical alignment structures which serve as spacers between the two vertical components. The planar components are positioned relative to each other such that the polarized direction of one component is perpendicular to the other and the LC tilt directions, upon application of a voltage, have a finite projection onto both polarizer directions. Sealed in the space between the two components is a liquid crystal material. A variety of different suitable liquid crystals are known to those of skill in the art. Preferred liquid crystals include negative LC's such as Merck LC95-465. The liquid crystals of the subject displays are aligned vertically relative to the planar polarizing materials and, as such, the subject liquid crystal displays are homeotropic liquid crystal displays.

Turning now to the production of the subject alignment layers and liquid crystal displays comprising the same, the first step is to produce alignment structures made from a suitable material on the surface of the planar component or substrate of the alignment layer, where the substrate may be a composite of a plurality of different layers, where such layers may include a polarized layer, e.g. polarized glass, an electrode layer, e.g. indium tin oxide layer, a layer of ion beam inert material, etc. The alignment layer structures may be produced using any convenient methodology suitable for the generation of micrometer size structures. As such, photolithographic means may be used to produce the structures of the alignment layer. Where photolithographic means are used to produce the alignment layer walls, a mask(s) and electromagnetic radiation are used to selectively produce a defined pattern of walls or pillars in the alignment layer film. Photolithographic methods and devices for use in practicing such methods are well known to those of skill in the art. Photolithographic methods and devices are described in U.S. Pat. Nos. 5,777,342; 5,776,836; 5,747,221; 5,744,305; 5,636,004; the disclosures of which are herein incorporated by reference. See also Methods and Materials in Microelectronic Technology (IBM Research Symposia Series) (Joachim Bargon ed. Plenum Pub Corp; ISBN: 0306418037) (1984).

Figure 5:
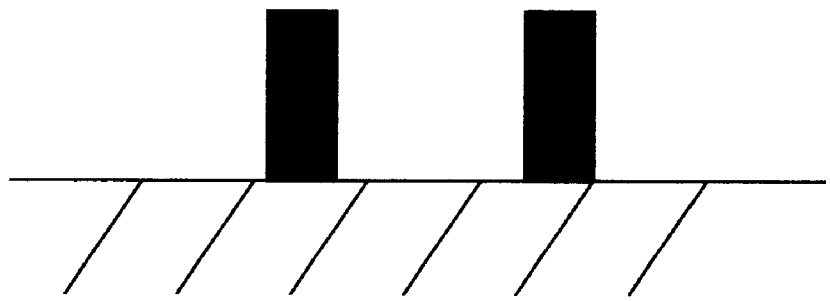
FIGS. 5A and 5B show alignment structures in black which were manufactured by a suitable method but consist of a material not suitable for ion beam alignment. In this case the alignment structure(s) may be coated with a thin coat that lends itself for ion beam alignment.
Figure 5:
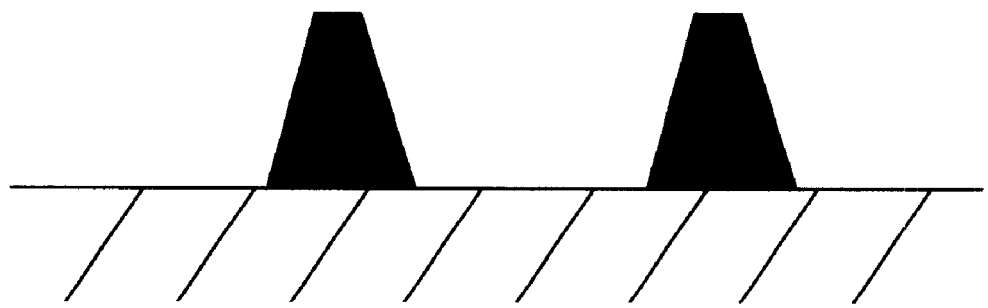

Other methods for producing arrays of small structures include additional microfabrication methods, where such methods include: stamping techniques, casting techniques, laser texturing techniques, chemical self assembly techniques, and other microfabrication methods. If the material used for generating the structures is not suitable for ion beam alignment as discussed below, the walls of the structured surface may be coated with a suitable material using sputtering, chemical vapor deposition, evaporation or the like to produce a protective coating layer with a thickness ranging from about 0.1 to 100 nm, usually from about 0.2 to 50 nm and more usually from about 1 to 20 nm. A representative coated alignment structure is schematically indicated in FIG. 5. By use of a suitable directional coating method such as evaporation and a wall based structure such as the one shown in FIG. 4 one may coat only the wall surfaces and not the planar floor structures. One simply chooses the deposition direction so that the wall shadows the floor area, as is known by those of skill in the art.

The next step in process is to bombard at least a portion of the surface of the walls or pillars with ions. By "bombarding" is meant that the surface of the wall is exposed or irradiated to a particle beam consisting of atoms, molecules, or clusters with neutral or ionic charge. The ion beam may be generated in an ion beam generating device from a gas, where such devices are known to those of skill in the art. See U.S. Pat. Nos. 5,661,366, 5,151,605; 5,149; 5,065,034; 4,939,360; 4,785,188; 4,683,378; 4,568,833, the disclosures of which are herein incorporated by reference. A representative ion beam generating device is disclosed in U.S. patent application Ser. No. 09/028,018 filed Feb. 23, 1998 (IBM Ref: YO997-383), the disclosure of which is herein incorporated by reference. The ion beam may be generated from a number of different gases, where such gases include: noble or inert gases, such as helium (He), argon (Ar), neon (Ne), krypton (Kr) or xenon (Xe); an admixture of a noble gas with an active gas, such as nitrogen, fluorine, a fluorocarbon, or a hydrocarbon; nitrogen; oxygen; or combinations thereof. The kinetic energy to the ion beam will generally be at least about 5 eV, usually at least about 10 eV and more usually at least about 50 eV where the energy value of the ion beam will not exceed about 1000 ev and usually will not exceed about 300 eV. The total ion beam dose will typically be in the range $10^{14}$–$10^{18}$ ions/cm$^2$, more typically $10^{16}$ ions/cm$^2$.

The angle of incidence of the ion beam on the wall surface influences the pre-tilt of the liquid crystal molecules. As such, the angle of incidence, i.e. the angle of the ion beam with respect to the alignment layer floor normal, will generally range from about 10° to 80°, usually from about 20° to 70° and more usually from about 30° to 60°.

Figure 6A:
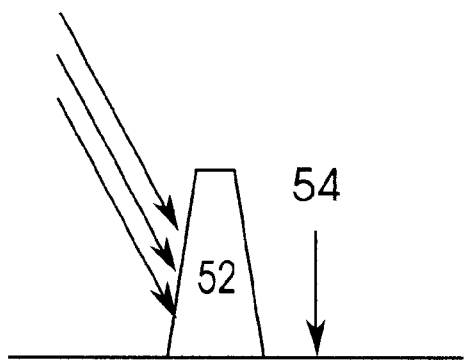
FIGS. 6A & 6B show an ion beam bombardment protocol in which only one side of the walls is irradiated.
Figure 6B:
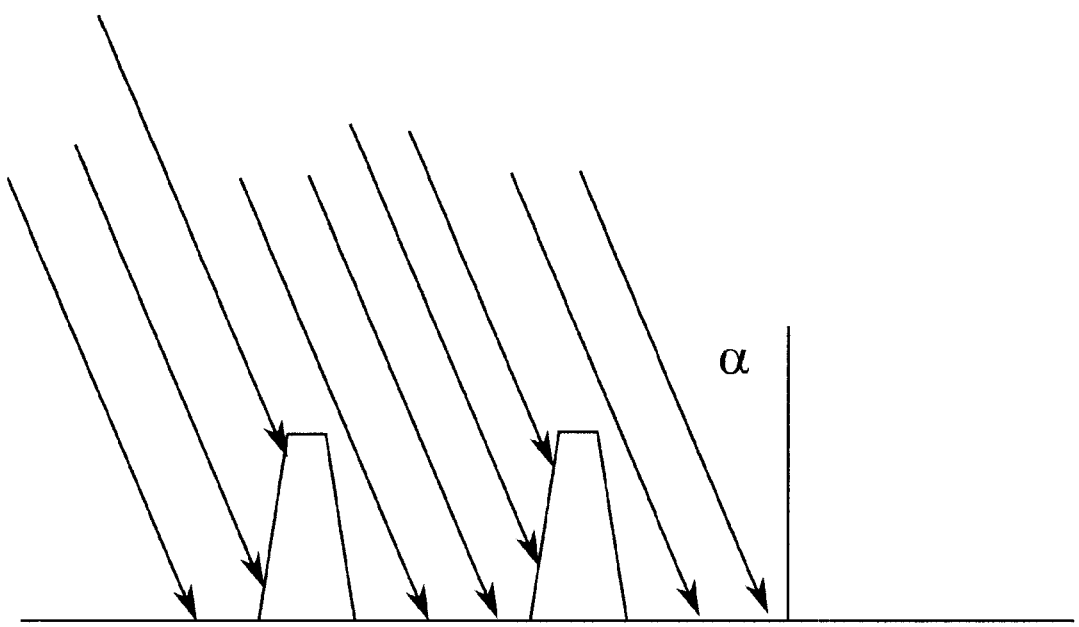
Figure 7A:
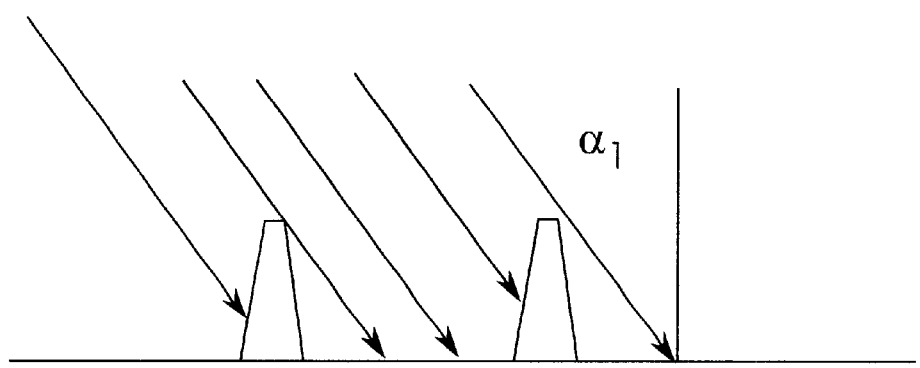
FIGS. 7A and 7B show an ion beam bombardment protocol in which both sides of the walls are irradiated.
Figure 7B:
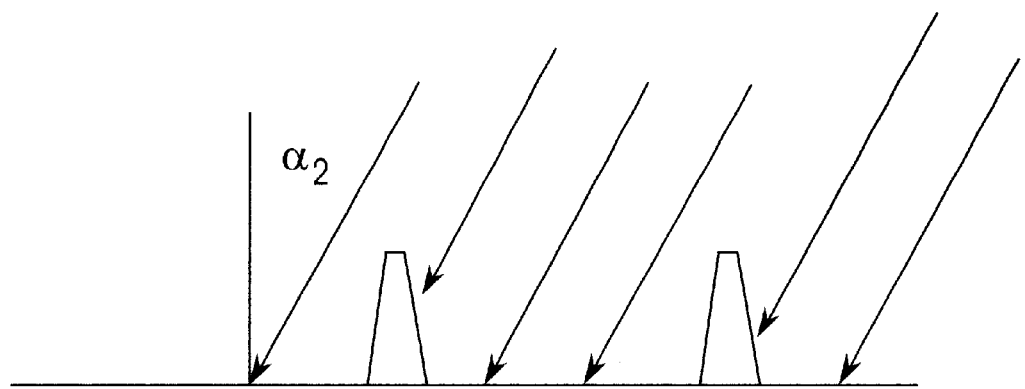

The particular ion bombardment protocol may vary depending on the desired pretilt of the liquid crystal molecules, the particular materials from which the various components of the alignment layer are produced, the dimensions of the wall, e.g. perpendicular or inclined, etc. Thus, in an alignment layer characterized by the presence of a series of parallel raised walls, in certain embodiments only one side of each wall will be irradiated with the ion beam, as shown in FIG. 6. Alternatively, where one wishes to irradiate all sides of the vertical structures, the alignment layer may be rotated in discrete increments, e.g. 90°, with respect to the ion beam source, or vice versa, so that all vertical surfaces are bombarded as indicated in FIGS. 7A and 7B. In case of structures with cylindrical symmetry about the substrate normal the alignment layer may be continuously bombarded as it is rotated relative to the ion beam source.

Figure 8:
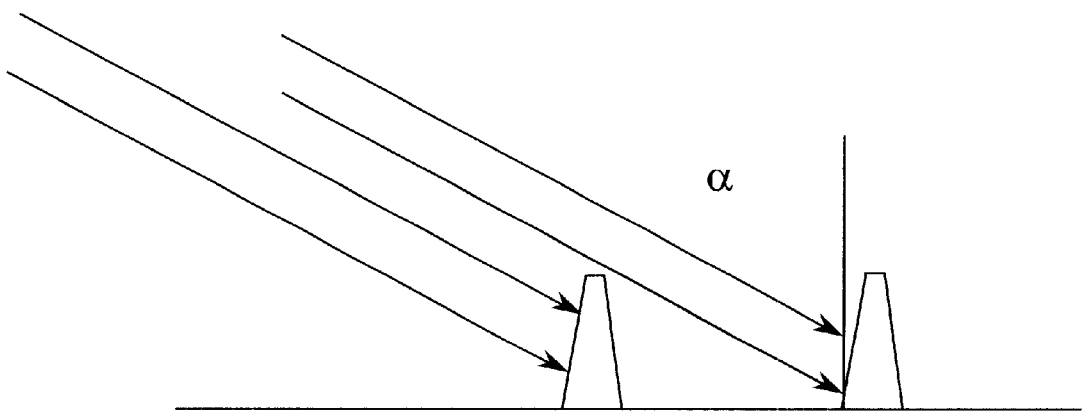
FIG. 8 shows yet another ion beam bombardment protocol in which the surface of alignment layer need not be fabricated from an ion beam inert material. The angle of incidence of the ion beam is chosen so that the alignment layer surface is shadowed from the ion beam by a wall and it is therefore never irradiated during the bombardment process.

Certain manufacturing methods may yield alignment layers where the alignment structures and the floor layer consist of the same material. In this case one can avoid ion beam alignment of the floor by choosing a suitable ion beam incidence angle so that the floor lies in the ion beam shadow cast by the wall(s) as shown in FIG. 8.

The pretilt of the liquid crystal molecules in the display comprising the subject alignment layers can be manipulated in a number of different ways. Thus, one can modulate the pretilt by the angle of incidence of the ion beam, as described above. In addition, the pretilt can be modulated by the incline of the wall rising from the floor of the substrate, e.g. by having walls that are perpendicular to the substrate or having walls that incline at a certain angle away from the substrate normal, as described above. The pretilt can also be modulated by the portions of the walls that are exposed to the ion beam, e.g. by exposing only one of the wall surfaces or all of the wall surfaces. Thus, the pretilt of the liquid crystal molecules can be tailored to meet a desired specification through proper selection of a number of different parameters.

Homeotropic liquid crystal displays are prepared from the subject alignment layers using methodology well known to those of skill in the art. Generally, two planar components comprising the subject alignment layers on their surface are positioned in opposing relationship to each other such that the direction of polarization in one component is perpendicular to the direction of polarization of the other component. A suitable liquid crystal material is introduced and sealed into the space between the two planar components. For further detail on the preparation of liquid crystal displays, see IBM J. Res. Develop. 36, 1992 and "Color TFT Liquid Crystal Displays", Semiconductor Equipment and Materials International, Mountain View, Calif. (1996).

The resultant homeotropic liquid crystal display devices of the subject invention find use in a variety of different applications, including as a flat panel displays in laptop computers, as a flat panel displays for desktop monitors, as a flat panel displays for televisions, and the like.

It is evident from the above results and discussion that improved methods of producing homeotropic liquid crystal displays are provided. The subject methods are compatible with standard wet or dry processing. Furthermore, the process provides for easy control over the pretilt of the liquid crystal molecules.

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

What is claimed is:

1. An alignment layer for use in a homeotropic liquid crystal display, said alignment layer comprising:
    at least one alignment structure rising from a planar substrate comprised of an amorphous material, wherein the alignment structure comprises at least one pillar or wall and at least one surface of said alignment structure has bond anisotropy induced by ion bombardment of said substrate, whereby said bond anisotropy aligns liquid crystal molecules substantially vertical to said planar substrate, and further wherein the alignment layer is comprised of a material selected from the group consisting of hydrogenated diamond-like carbon, amorphous hydrogenated silicon, SiC, $Si_3N_4$, $CeO_2$, and $ZnTiO_2$.

2. The alignment layer according to claim 1, wherein said alignment layer comprises a plurality of alignment structures on said planar substrate.

3. The alignment layer according to claim 2, wherein said plurality of alignment structures are arranged in a regular cubic, rectangular or hexagonal pattern across said planar substrate.

4. The alignment layer according to claim 2, wherein said plurality of alignment structures form a plurality of cells on said planar substrate.

5. The alignment layer according to claim 1, wherein said alignment structure rises substantially perpendicular to said planar substrate.

6. The alignment layer according to claim 1, wherein said alignment structure rises at an incline from said planar substrate.

7. The alignment layer according to claim 1, wherein said bond anisotropy produces a pretilt angle in said vertically aligned liquid crystal molecules ranging from about 1° to 10° from the normal of said planar substrate.

8. The alignment layer according to claim 1, wherein said alignment structure is a wall.

9. The alignment layer according to claim 1, wherein said alignment structure is a pillar.

10. The alignment layer according to claim 9, wherein said bond anisotropy produces a pretilt angle in vertically aligned liquid crystal molecules positioned on said wall ranging from about 1° to 10°.

11. A liquid crystal display, the improvement comprising:
   the presence of at least one alignment layer according to claim 1.

12. A method of producing a homeotropic liquid crystal display, said method comprising:
   (a) producing first and second substrates wherein at least one of said substrates comprises an alignment layer as described in claim 1;
   (b) positioning said first and second substrates in opposing relationship to each other; and
   (c) introducing a liquid crystal material between said first and second substrates;
   wherein said homeotropic liquid crystal display is produced.

13. An alignment layer for use in a homeotropic liquid crystal display, said alignment layer comprising:
   a plurality of alignment structures rising from a planar substrate comprised of an amorphous material, where at least one alignment structure comprises a pillar or wall and at least a portion of each alignment structure has a bond anisotropy on its surface induced by ion bombardment of said substrate, whereby said bond anisotropy aligns liquid crystal molecules substantially vertical to said planar substrate, and further wherein the alignment layer is comprised of a material selected from the group consisting of hydrogenated diamond-like carbon, amorphous hydrogenated silicon, SiC, $Si_3N_4$, $CeO_2$, and $ZnTiO_2$.

14. The alignment layer according to claim 13, wherein said plurality of alignment structures comprises a plurality of walls on said planar substrate.

15. The alignment layer according to claim 14, wherein said plurality of walls are configured to produce a plurality of cells on said planar substrate.

16. The alignment layer according to claim 14, wherein said walls rise substantially perpendicular to said planar substrate.

17. The alignment layer according to claim 14, wherein said walls rise at an incline from said planar substrate.

18. The alignment layer according to claim 13, wherein said alignment layer comprises a plurality of pillars on said planar substrate.

19. The alignment layer according to claim 18, wherein said plurality of pillars are configured to produce a plurality of cells on said planar substrate.

20. A method of producing an alignment layer for use in a homeotropic liquid crystal display, said method comprising:
   providing a planar substrate having an amorphous alignment film comprised of a material selected from the group consisting of hydrogenated diamond-like carbon, amorphous hydrogenated silicon, SiC, $Si_3N_4$, $CeO_2$, and $ZnTiO_2$ formed thereon, the planar substrate having at least one alignment structure comprised of at least one pillar or wall arising therefrom and having no bond anisotropy; and
   bombarding a surface of said alignment structure with an ion beam having a kinetic energy less than approximately 1000 eV to produce bond anisotropy on a surface of said at least one alignment structure thereby aligning liquid crystal molecules substantially vertical to said planar substrate.

21. The method according to claim 20, wherein said alignment structure is prepared by a microfabrication technique.

22. The method according to claim 21, wherein said microfabrication technique is photolithography.

23. The method according to claim 22, wherein said surface of said alignment structure is bombarded by ions at an angle ranging from about 20° to 70°.

24. The alignment layer produced according to the method of claim 20.

\* \* \* \* \*